United States Patent [19]

De Bock et al.

[11] Patent Number: 5,428,150
[45] Date of Patent: Jun. 27, 1995

[54] STARCH BASED MATERIAL

[75] Inventors: Ingrid L. H. A. De Bock, Asse-Kobbegem; Philip M. R. Van Den Broecke, Mechelen; Karl-Heinz Bahr, Grimbergen, all of Belgium

[73] Assignee: Cerestar Holding B.V., Netherlands

[21] Appl. No.: 155,724

[22] Filed: Nov. 23, 1993

[30] Foreign Application Priority Data

Nov. 24, 1992 [GB] United Kingdom ............... 9224557

[51] Int. Cl.⁶ .................... C08J 3/00; C08J 5/00; C08J 3/18
[52] U.S. Cl. .................... 536/102; 536/103; 536/105; 536/123; 264/330
[58] Field of Search ............... 536/102, 103, 105, 123; 264/330

[56] References Cited

U.S. PATENT DOCUMENTS

| 4,698,264 | 10/1987 | Steinke | 428/402.2 |
| 5,275,774 | 1/1994 | Bahr et al. | 264/211 |

FOREIGN PATENT DOCUMENTS

| 0282451 | 9/1988 | European Pat. Off. |
| 0298920 | 1/1989 | European Pat. Off. |
| 0304401 | 2/1989 | European Pat. Off. |
| 0326517 | 8/1989 | European Pat. Off. |
| 0408501 | 1/1991 | European Pat. Off. |
| 0408502 | 1/1991 | European Pat. Off. |

*Primary Examiner*—Nathan M. Nutter
*Attorney, Agent, or Firm*—Cushman Darbu & Cushman

[57] ABSTRACT

A process for the extrusion of a starch-containing composition to produce a material suitable for the production of moulded articles in which the composition contains in addition to the starch a starch degradation product selected from starch hydrolysis products having DE's of 1 to 40, particularly a maltodextrin, oxidized starches and pyrodextrins.

17 Claims, No Drawings

STARCH BASED MATERIAL

The present invention relates to a starch based material which has particular utility in the production of shaped, biodegradable articles.

In recent years a growing interest has developed in replacing disposable articles made from non-biodegradable materials with biodegradable equivalents. Starch is a substance which has attracted particular attention as a biodegradable replacement especially as a replacement for synthetic polymeric materials in packaging and similar applications which have an inherent waste disposal problem.

As long ago as the early 1970's the concept of using starch as the basis of a biodegradable article such as a wrapping film was disclosed in a series of UK patents namely 1 485 833, 1 487 050, 1 524 821, 1 592 062, 1 600 496, 1 600 497 and 2 029 836. These patents also describe the use of mixtures of starch with a thermoplastic polymer and the formation of shaped articles from starch or a mixture of starch and a thermoplastic polymer by extrusion or injection moulding.

More recently the proposal has been made to make biodegradable articles from starch that has been subjected to a heat/pressure treatment which is said to destructure the starch molecule to produce a form of starch which, when moulded, is alleged to give articles of improved form stability and minimum dimensional deviation. European patent 118 240 for instance describes and claims a process for making a molecular dispersion of starch in water by (a) maintaining a composition of starch and water (5–30% water based on the weight of the composition) under controlled conditions of temperature and pressure, (b) heating the composition under elevated pressure to a temperature, above its glass transition temperature and melting point while maintaining the water content, thereby to form a melt and (c) further heating and plasticising the melt to dissolve the starch in the water into an essentially molecularly dispersed form, the temperature during the process being in the range of 80° to 240° C. EP 118 240 also contains a description of the injection moulding of the molecularly dispersed starch particularly to produce capsules.

Subsequent patent applications filed after EP 113 240 disclose various modifications and developments of the process and product described in EP 118 240 namely:

EP282 451 A - In this patent application the starch composition, containing 10 to 25% water based on the composition is heated in the presence of a chain scission catalyst, such as an acid or alkali, in a closed volume to an elevated temperature and the heating continued until the average molar mass of the material is reduced by a factor of 2 to 5000 compared with its original mass average molar mass. This process modification is said to reduce the incidence of surface defects and to improve the extensibility of the products produced by the process of EP 118 240.

EP 298 920 A - The process described in this patent is applicable particularly to potato starch and involves a pretreatment of the starch to remove free electrolytes and metallic cations associated with phosphate groups of the starch and optionally replacing the cations with specified metallic monovalent and/or polyvalent cations. The starch so produced, with a water content of 10 to 25% by weight based on starch and water, is then used in the process of EP 118 240. This process modification is also said to reduce the incidence of surface defects and to improve the extensibility of the moulded products.

EP 304 401 A - Whereas the molecularly dispersed starch in water composition of EP 118 240 is extruded in molten form as soon as it is produced, the process of EP 304 401 A first allows the composition to solidify and then remelts it for injection moulding. The process of EP 118 240 is said to be made more stable by operating in this manner and the moulded products to have greater physical strength.

EP 326 517 A - The process feature disclosed in this patent application is to heat the starch and water composition (containing 5 to 40% by weight water based on the weight of the composition) until it has undergone all endothermic transitions including the final narrow endothermic transition just prior to the endothermic change characteristic of oxidative and thermal degradation of the starch. By adopting this feature the process of EP 118 240 is said to be more stable and the products produced to have greater physical strength.

EP 391 853 A- Potato starch is particularly the subject of this patent application because it is obligatory for the starch used to have bound phosphate groups. The relative concentrations of the cations and protons bound to the phosphate groups are regarded as critical and are specified as lying within certain limits. The advantages of the adopting the process feature described and claimed in EP 391 853 are said to be a reduction in surface defects in the articles produced and an improved extensibility.

The five patent applications described above employ the descriptive term "destructured starch" instead of the expression "molecularly dispersed starch in water" used in EP 118 240.

In addition to EP 118 240 and the associated five patent applications which relate principally to the production of destructured starch there are thirteen patent applications which are concerned with compositions comprising destructured starch and a synthetic thermoplastic polymeric material. EP 327 505 A contains the general disclosure of such compositions while the following twelve patent applications are directed at combinations of destructured starch with specific thermoplastic polymers. The applications are EP 404 723 A, 404 727 A, 404 728 A, 407 350 A, 408 501 A, 408 502 A, 408 503 A, 409 781 A, 409 782 A, 409 783 A, 409 788 A and 409 789 A.

All of the patent publications referred to above whether concerned with destructured starch or combinations of destructured starch with synthetic thermoplastic polymeric materials describe the addition of other substances to the basic starch and water composition which is used in the production of the destructured starch. Particular additional components include :

"Extenders" which are essentially hydrophilic polymeric materials which are water-soluble or water-swellable. Examples include gelatin, proteins, water-soluble polysaccharides such as gums, pectin and cellulose derivatives and various water soluble synthetic polymers.

"Inorganic Fillers" such as oxides of magnesium, silicon, titanium etc.

"Plasticisers" which include low molecular weight poly(alkylene oxides) glycerol, glyceryl monoacetate, propylene glycol and sorbitol, and higher molecular weight products such as polyvinyl alcohol, amylose and xanthan gums.

"Colouring Agents" eg. azo dyes, natural pigments or inorganic pigments. "Flow-Improvers" Examples of these additives are animal and vegetable fats preferably in their hydrogenated form, alone or together with mono-and/or diglycerides or phosphatides especially lecithin.

It has been our experience when experimenting with the production of moulded, starch-containing products that difficulties are encountered which investigation has revealed are attributable to the viscosity of the melt in the moulding process. The difficulties relate specifically to control of the amount of material fed to the mould because of the high back-pressure, incomplete filling of the mould and the extreme brittleness of the moulded product. We have now found however that these difficulties may be substantially reduced by including in the starch moulding composition certain starch degradation products.

Accordingly, the present invention comprises a process for the extrusion of a starch-containing composition to produce a material suitable for the production of moulded articles which is characterised by the presence in the composition of starch and a starch degradation product selected from the group consisting of starch hydrolysis products having DEs of 1 to 40, oxidised starches and pyrodextrins.

The starch which may be used in the process of the invention may be a tuber or grain starch and may be modified eg. by esterification or etherification. Preferably however the starch is native potato starch, tapioca starch, wheat starch or corn (maize) starch or their waxy equivalents. If desired, mixtures of starches may be used eg. a mixture of corn starch and waxy corn starch.

The starch degradation product may also be derived from a grain or tuber starch and may be derived from the same or a different type of starch as is used in the composition. "Starch hydrolysis products" are starch derivatives which have been degraded by hydrolysis catalysed either by an acid or an enzyme. The extent of the degradation is indicated by the D.E. or "dextrose equivalent" value which is the reducing power of the starch hydrolysate expressed as D-glucose on the dry basis. The lower the DE value the higher the molecular weight of the hydrolysate and the less the extent of degradation. Conventionally, hydrolysates with DEs up to 20 are termed maltodextrins and those with DE values greater than 20 as spray-dried glucose syrups. The hydrolysis products used in the process of the present invention are preferably maltodextrins and more preferably have DE values of 2 to 20.

"Oxidised Starches" are commercial products which outwardly resemble native starch in as much as they have the same granule structure, shows typical polarisation crosses, are insoluble in cold water and show the characteristic starch colour reactions with iodine. When heated with water however oxidised starches give thinner solutions than native starch, indicative of a degree of degradation produced by the oxidation process. The most common agent used for: the oxidation is a hypochlorite, especially sodium or calcium hypochlorite although per-compounds may also be used.

"Pyrodextrins" are starch degradation products which are produced by heating a starch, with or without the addition of chemical reagents such as alkali or acids. During the process the starch amylose and amylopectin molecules are degraded into molecules of shorter chain length which may remain as such or which may recombine to give new molecules.

The amount of the starch degradation product present in the composition is preferably 0.5 to 50% by weight, more preferably 1 to 30% (This percentage and all other percentages expressed in this specification and claims are, unless indicated to the contrary, by weight based on the total weight of the composition.)

The starch-containing composition preferably also includes water particularly up to 10% water (unless indicated to the contrary, water concentrations in this specification and claims refer to added water and do not include any water contained in the starch components). In addition, it is preferred that the composition contains a plasticiser suitably from 10 to 30%. The plasticiser preferably has a low molecular weight for example a low molecular weight poly(alkylene oxide), pentaerythritol, glyceryl monoacetate, diacetate or triacetate, erythritol, propylene glycol, a $C_1$ to $C_4$ alkyl citrate or a $C_1$ to $C_4$ alkyl phthalate, trimethylol propane or, particularly, glycerol or sorbitol. The process is further facilitated if the composition contains an emulsifier. Many commercially available emulsifiers are suitable for this purpose but glyceryl esters of long chain fatty acids, eg. glyceryl monosterarate, are particularly effective, suitably in an amount 1 to 5%.

A preferred composition for use in the process of the invention comprises starch, a starch degradation product, a low molecular weight plasticiser, water and, optionally, an emulsifier. A more preferred composition comprises corn starch, a maltodextrin of DE 2 to 20, glycerol or sorbitol, water and, optionally, an emulsifier, particularly glyceryl monostearate. Particularly preferred is a composition which contains corn starch, 10 to 30% glycerol or sorbitol, 1 to 25% maltodextrin of DE 2 to 20, 5 to 10% water and up to 5% of an emulsifier, particularly glyceryl monostearate.

The compositions Used in the process of the invention may also include other components according to need for example, inorganic fillers such as titanium dioxide, colouring matter, a mould release agent such as magnesium stearate, a crosslinking agent for the starch eg. ethylene di-methylol urea to improve the wet-resistance of a subsequently moulded product and/or a blowing agent eg. a carbonate and/or talc to ensure homogeneous expansion of the composition in a subsequent moulding process.

The conditions under which the extrusion process is conducted are, in general, those which have previously been described in the relevant literature, including the patent publications discussed above. The choice of the extruder is important because the extruder design influences the pressure and shearing effect imposed on the contents of the extruder. We have found that the extruder which was used to obtain the results given in the Examples later in this specification to be particularly suitable for use in the process of the invention ie a Werner and Pfieiderer ZSK 40. The temperature of the extruder barrel is preferably 20° to 170° C. more preferably 80° to 160° C. and the pressure measured immediately before the extruder exit is preferably $10 \times 10^5$ to $100 \times 10^5$ Pa particularly $20 \times 10^5$ to $70 \times 10^5$ Pa. The components of the composition may be premixed before being fed to the extruder or some may be premixed and the others added separately, final mixing taking place in the extruder barrel.

It is preferred that product leaving the extruder has a total water content (ie added water plus water contained in the starch components) of 2 to 12% and to this end water may be withdrawn from the product, if necessary, by reducing the pressure and providing a means for water withdrawal immediately before the product leaves the extruder.

The product leaving the extruder is suitably cut into pellets, eg. by a continuously rotating knife, cooled and stored preparatory to moulding in, for example, an injection moulding apparatus. Articles may be moulded from the product of the process of the invention as such but the product may be combined with a thermoplastic, polymeric material especially a synthetic, thermoplastic, polymeric material eg. polyethylene. If desired, the extruder may form part of an injection moulding machine and in this case the starch material is not separated but is directly injection moulded.

The effect of the degraded starch product in the compositions according to the invention is to facilitate the fluent running of the injection moulding machine, to enable a mould to be filled without the application of extreme pressure and to produce a moulded article which is relatively malleable without detracting from the strength of that article.

The invention will now be further described and illustrated by reference to the following Examples.

EXAMPLES

The extruder used was an intermeshing, co-rotating, twin screw extruder (Werner and Pfleiderer ZSK 40, with L/D of 28) the barrel surrounding the screw having eight consecutive zones each zone having a controlled temperature as follows:

| Zone | 1 | 2 | 3 | 4 | 5 | 6 | 7 | 8 |
|---|---|---|---|---|---|---|---|---|
| Temperature °C. | 20 | 110 | 150 | 150 | 150 | 150 | 110 | 90 |

Means for introducing test material was located in zone 2, zone 1 serving as a temperature buffer to prevent the material being introduced at zone 2 becoming overheated. Zones 3, 4, 5 and 6 were heating zones in which the material under test was heated while being plasticised and moved along the extruder barrel under influence of the twin screws. Zone 7 was a moisture-control zone provided with exit means from which water could be removed by reducing the pressure. The final cooling zone 8 was followed by a die having six holes each hole being of 4.0 mm diameter. The pressure in the heating zones was about $60 \times 10^5$ Pa and in the moisture control zone about $40 \times 10^5$ Pa. The feed rate to the extruder was 30 kg/hour, the screw rotation speed 200 rpm and the residence time of test material in the extruder about 2 minutes.

EXAMPLE 1

Two compositions were extruded in the equipment described above. The compositions were:
A 76.5% corn starch, 22.1% glycerol, 1.4% glyceryl monostearate
B 59.1% corn starch, 21.0% glycerol, 1.7% glyceryl monostearate, 12.9% maltodextrin (DE 18) +5.3% water.

The starch, glyceryl monostearate and maltodextrin were premixed before being fed to the extruder, the glycerol and water being fed separately.

The properties of the extruded product which are regarded as significant are, tensile strength at break, E-modulus and elongation at break. In addition, the flowability of the material was assessed by measuring the diameter of a film formed from 6 grams of material under test under a pressure of $150 \times 10^5$ Pa at 150° C. The larger the diameter the greater the flowability of the material under test while flowability is in turn a reflection of the viscosity of the melt in the extrusion process, a higher flowability indicating a lower extrusion pressure. In general, a flowability of more than about 160 is desirable. The tensile strength, E-modulus and elongation at break are indicative of the strength of the moulded product.

The results obtained were:

| | Tensile strength at break MPa | E-modulus MPa | Elongation at Break % | Flowability mm |
|---|---|---|---|---|
| A | 1.9 | 34.1 | 90 | 154 |
| B | 1.5 | 33.9 | 92 | 178 |

The greater diameter of the test-piece in B above indicates the improved flowability of the product while the strength properties of the product of B remain of the same order as those of A ie. the composition of B was easier to process without deterioration in the strength of the product produced.

EXAMPLE 2

Four compositions were successfully extruded using the process according to the invention and the equipment described above. The compositions were as follows:
C Corn starch 67.2%, maltodextrin (DE 5) 3.9% glycerol 21.7%, water 5.4%
D Corn starch 68.7%, spray-dried glucose syrup (DE 21) 2.0%, glycerol 21.9%, water 5.6%
E Corn starch 66.6%, spray-dried glucose syrup (DE 21) 4.0%, glycerol 22.1%, water 5.5%
F Corn starch 67.1%, spray-dried glucose syrup (DE 37) 4.0%, glycerol 21.7%, water 5.4%

Each composition also contained 1.8% glyceryl monostearate.

The flowability measurements for the five compositions were as follows:
C 168 mm
D 176 mm
E 174 mm
F 166 mm

EXAMPLE 3

The following compositions were successfully extruded by the process of the present invention using the equipment described above.
G 39.3% corn starch, 30.5% oxidised starch (average m.wt 37.890)
H 59.6% corn starch, 10.2% oxidised starch (average m.wt 44.820)
I 39.3% corn starch, 30.5% oxidised starch (average m.wt 44.820)
J 18.9% corn starch, 50.9% oxidised starch (average m.wt 44.820)
K 39.3% corn starch, 30.5% oxidised starch (average m.wt 54.210)

The average molecular weights quoted are number average molecular weights.

Each composition also contained 22.6% glycerol, 5.7% water and 1.9% glyceryl monostearate respectively.

The flowability measurements for the five compositions were as follows:

G 191 mm
H 172 mm
I 186 mm
J 200 mm
K 182 mm

EXAMPLE 4

The following compositions were successfully extruded by the process of the present invention in the equipment described above L 39.3% corn starch, 30.5% pyrodextrin (average m.wt. 8.710), 22.6% glycerol, 5.7% water M 59.8% corn starch, 10.2% pyrodextrin (average m.wt. 24.490), 22.4% glycerol, 5.7% water N 39.3% corn starch, 30.5% pyrodextrin (average m.wt. 24.490), 22.6% glycerol, 5.7% water O 20.1% corn starch, 53.9% pyrodextrin (average m.wt. 24.490), 24.0% glycerol P 39.3% corn starch, 30.5% pyrodextrin (average m.wt. 42.400), 22.6% glycerol, 5.7% water The average molecular weights are number average molecular weights.

Compositions L, M, N and P each contained 1.9% glyceryl monostearate and composition O 2.0% glyceryl monostearate.

The flowability measurements for the five compositions were as follows:

L>230 mm
M 172 mm
N 203 mm
O 206 mm
P 184 mm

We claim:

1. In a process for the manufacture of a composition suitable for the production of molded articles which comprises extruding a starch composition under conditions of temperature and pressure which will destructure the starch;
the improvement in which the starch composition which is extruded contains starch and a starch degradation product selected from the group consisting of starch hydrolysis products having a DE of 1 to 40, oxidized starches and pyrodextrins.

2. A process as set forth in claim 1 in which the starch in the starch composition is selected from the group consisting of maize starch, potato starch, tapioca starch and wheat starch.

3. A process as set forth in claim 2 in which the starch degradation product is a maltodextrin.

4. A process as set forth in any one of claims 1–3 in which the starch composition which is extruded contains 0.5 to 50% by weight of said starch degradation product.

5. A process as set forth in claim 4 in which the starch composition which is extruded contains 1 to 30% by weight of said starch degradation product.

6. A process as set forth in claim 1 in which the starch composition which is extruded contains up to 10% water.

7. A process as set forth in claim 1 in which the starch composition which is extruded contains a plasticizer.

8. A process as set fort in claim 7 in which the amount of plasticizer is 10 to 30% by weight of the starch composition which is extruded.

9. A process as set forth in claim 7 in which the plasticizer is a member of the group consisting of glycerol and sorbitol.

10. A process as set forth in claim 1 in which the starch composition which is extruded contains an emulsifier.

11. A process as set forth in claim 10 in which the emulsifier is glyceryl monostearate.

12. A process as set forth in claim 10 in which the amount of emulsifier is 1 to 20% by weight of the starch composition which is extruded.

13. A starch-containing composition for the manufacture by extrusion of a material suitable for the production of molded articles, said starch-containing composition comprising starch, a starch degradation product, a low molecular weight plasticizer and water.

14. A starch-containing composition as set forth in claim 13 which also contains an emulsifier.

15. A starch-containing composition as set forth in claim 14 which comprises corn starch, 10 to 30% by weight of a member of the group consisting of glycerol and sorbitol, 1 to 25% by weight of maltodextrin of DE 2 to 20 and 5 to 30% by weight water.

16. A composition as set forth in claim 15 which also contains up to 5% by weight of an emulsifier.

17. A composition as set forth in claim 16 in which the emulsifier is glyceryl monostearate.

* * * * *